No. 816,654. PATENTED APR. 3, 1906.
J. N. EVERETT.
VEHICLE BRAKE.
APPLICATION FILED OCT. 5, 1905.
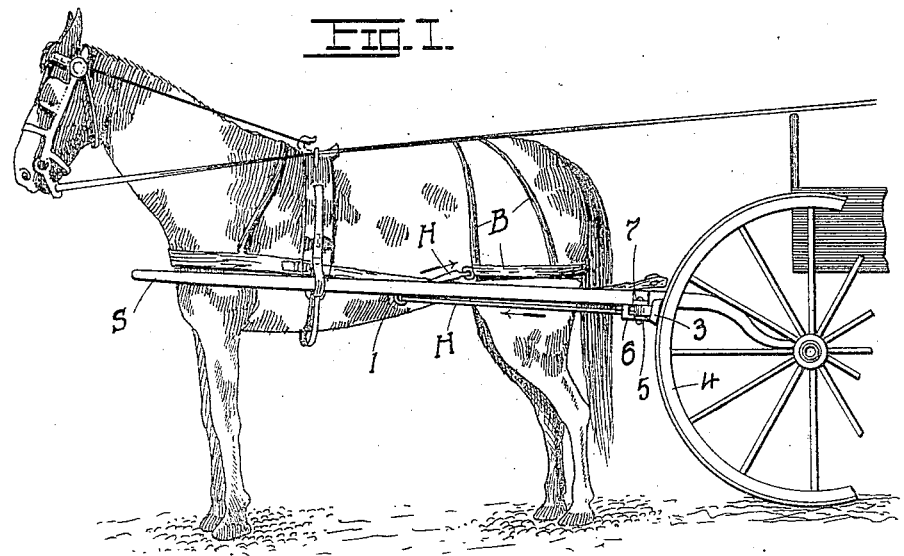
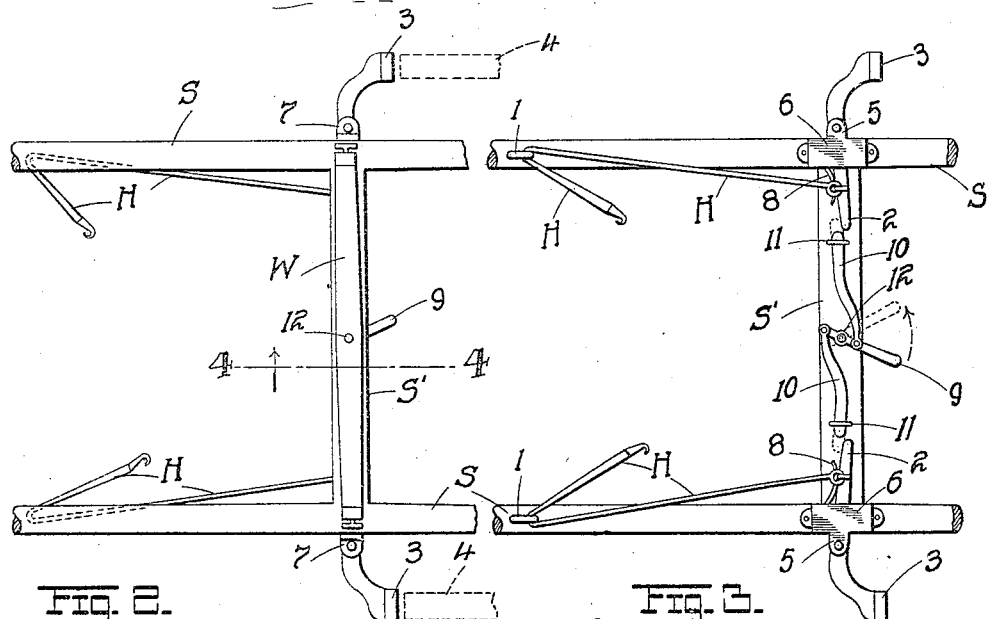
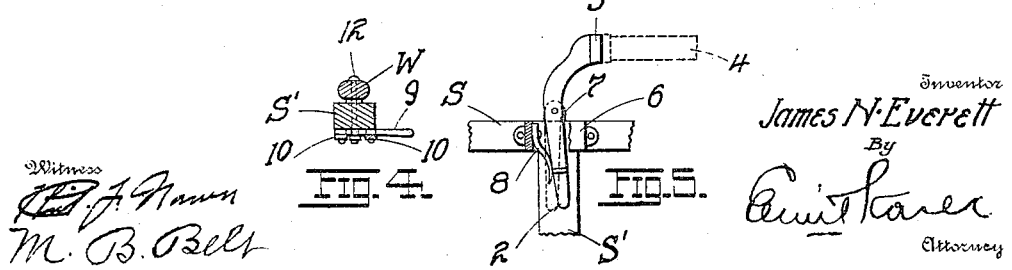
Inventor
James N. Everett

UNITED STATES PATENT OFFICE.

JAMES N. EVERETT, OF PACIFIC, MISSOURI.

VEHICLE-BRAKE.

No. 816,654.  Specification of Letters Patent.  Patented April 3, 1906.

Application filed October 5, 1905. Serial No. 281,452.

*To all whom it may concern:*

Be it known that I, JAMES N. EVERETT, a citizen of the United States, residing at Pacific, in the county of Franklin and State of Missouri, have invented certain new and useful Improvements in Vehicle-Brakes, of which the following is a full, clear, and exact description, reference being had to the accompanying drawings, forming a part hereof.

My invention has relation to improvements in vehicle-brakes; and it consists in the novel construction and arrangement of parts more fully set forth in the specification and pointed out in the claims.

In the drawings, Figure 1 is a side elevation of the front end of a buggy having my invention applied thereto. Fig. 2 is a top plan of the shafts, showing the invention applied thereto. Fig. 3 is a bottom plan of Fig. 2. Fig. 4 is a vertical section on line 4 4 of Fig. 2, taken through the cross-bar and swingletree; and Fig. 5 is an enlarged detail showing the spring for controlling the brake-shoe.

The object of my invention is to provide a vehicle with a brake mechanism which will be automatically set either when the draft-animal is descending a hill or going downgrade or when the animal should suddenly stop, the setting of the brakes taking the load off the animal or preventing the momentum thereof from shoving the animal off its feet.

In detail the invention may be described as follows:

Referring to the drawings, S represents the shafts; W, the swingletree; B, the breeching of the harness, and H the holdback-straps. In the present case each holdback-strap passes through a loop or eye 1 on the under side of the shaft, the front end of the strap being secured to the breeching and the rear end being secured to the inner long arm of a lever 2, whose outer arm is provided with a brake-shoe 3 opposite the wheel 4. The brake-lever 2 is pivoted between the lug 5 of a casting 6, secured on the under side of the shafts, and a lug or ear 7, secured to the sides of the shafts, as shown, though any equivalent mechanical way of mounting the lever will answer the same purpose. Normally the brake is disengaged from the wheel by a flexed spring or plate 8, whose fixed end is secured to the terminal wall of the casting 6, Fig. 5. When, however, the wagon is going downgrade or a steep incline, it is desirable to apply the brakes to prevent the animal from being shoved off its feet. The vehicle in thus descending an incline gains on the horse, which has the effect of tightening or drawing on the holdback-straps, the tension on the straps being as shown by the arrows in Fig. 1. The pull on the holdbacks under the circumstances will overcome the resilience of the springs 8 and oscillate the levers so as to bring the brakes against the wheels, Fig. 1 and dotted position, Fig. 5.

The same result as above described would follow were the animal to attempt to back up the vehicle. To keep the brakes disengaged when the driver desires to back up, the following provision is made: Pivoted at the center of the cross-bar S' of the shafts on the under side is a foot-lever 9, there being pivotally secured to said lever on each side of its pivotal point the reciprocating locking-bars 10 10, passing through guide-loops 11 11 on the cross-bar. Normally these bars are out of the path of the adjacent ends of the long arms of the brake-levers; but by oscillating the lever 9 to the opposite extreme from its normal position, (which may be accomplished by the foot of the driver or by using a rod or the butt-end of the driving-whip,) as shown by dotted position in Fig. 3, the outer ends of the bars 10 will become wedged in front of the brake-levers, the latter being thus locked against movement under the action of any draft exerted on the holdbacks by the backing of the animal, (or in descending a hill.) For light vehicles the brake-levers may be locked against movement in the manner indicated even when descending a grade, the brakes being allowed to be called into requisition only when the vehicle was heavily loaded and descending a very steep grade. As shown, the same pin 12 which secures the swingletree to the cross-bar S' forms the pivotal pin for the foot-lever 9. Of course the brake-levers 2 may be locked against movement by any other mechanical means without departing from the spirit of the invention.

Having described my invention, what I claim is—

1. In a vehicle, a spring-controlled brake-lever having a shoe normally disengaged from the wheel, a holdback-strap secured respectively to the lever and draft-animal and adapted when under tension to force the shoe against the wheel, and suitable locking mechanism mounted on the cross-bar of the shaft for preventing the setting of the brake when the holdback is under tension, substantially as set forth.

2. In a vehicle, a pair of shafts, brake-levers pivoted on opposite sides thereof, springs for keeping the levers normally disengaged from the wheels, horizontally-reciprocating locking-bars for locking the brake-levers against movement, and a lever pivoted to the cross-bar of the shafts for actuating the bars in either direction, substantially as set forth.

In testimony whereof I affix my signature in presence of two witnesses.

JAMES N. EVERETT.

Witnesses:
    EMIL STAREK,
    M. B. BELT.